United States Patent [19]

Fischer

[11] 4,330,287
[45] May 18, 1982

[54] RIBBED POWER TRANSMISSION BELT
[75] Inventor: Richard J. Fischer, Aurora, Colo.
[73] Assignee: The Gates Rubber Company, Denver, Colo.
[21] Appl. No.: 125,416
[22] Filed: Feb. 28, 1980
[51] Int. Cl.³ .......................... F16G 5/00; F16G 1/00
[52] U.S. Cl. ..................................... 474/238; 474/252
[58] Field of Search .................. 474/238, 249–252, 474/246, 265

[56] References Cited

U.S. PATENT DOCUMENTS

| 27,846 | 4/1860 | Underwood | 474/265 |
|---|---|---|---|
| 235,018 | 11/1880 | Poullain | 474/252 |
| 1,777,864 | 10/1930 | Short | 474/238 |
| 2,067,400 | 1/1937 | Koplin et al. | 474/238 |
| 2,728,239 | 12/1955 | Adams | 474/238 |
| 3,643,518 | 2/1972 | Semin et al. | 474/238 |
| 3,987,683 | 10/1976 | Singh | 474/238 |
| 4,047,446 | 9/1977 | Speer | 474/238 |

FOREIGN PATENT DOCUMENTS

| 1432 | of 1878 | United Kingdom | 474/238 |
|---|---|---|---|
| 20500 | of 1891 | United Kingdom | 474/238 |

Primary Examiner—Lawrence J. Staab
Attorney, Agent, or Firm—H. W. Oberg, Jr.; C. H. Castleman, Jr.; Raymond Fink

[57] ABSTRACT

A power transmission belt of the generally flat type having circumferential ribs, the ribs having oppositely facing converging sides characterized by convex sidewall portions.

9 Claims, 5 Drawing Figures

RIBBED POWER TRANSMISSION BELT

BACKGROUND OF THE INVENTION

The invention relates to endless power transmission belts, but more particularly, the invention relates to generally flat belts having a plurality of circumferential ribs adapted to engage a multi-grooved pulley.

Originally, multi-ribbed belts and pulleys were as disclosed in U.S. Pat. No. 2,728,239. Ribs of such belts were configured to register in pulley grooves to make complete contact with the walls of the pulley so that there was no clearance space between the belt ribs and pulley grooves during operation of the belt with the pulley. It was reasoned that the zero clearance permitted the belt ribs to set up a hydrostatic pressure from radial thrust urging the belt toward the pulley during its passage around the pulley.

The requirement for zero clearance between belt ribs and pulley grooves has eroded over the past twenty-five years as ribbed belts have been further developed for improved power transmission. The trend has been to provide clearance between a belt rib and pulley groove by making the belt rib smaller than the pulley groove to provide a radial clearance when viewed in cross section. Examples of such radial clearance appear in U.S. Pat. Nos. 3,643,518 and 4,047,446. A radial groove between adjacent belt ribs provides a positive clearance between the belt and the apexes of a grooved pulley in U.S. Pat. Nos. 3,818,741 and 4,047,446 to allow for wear of the belt ribs while preventing projections of the pulley between pulley grooves from contacting the belt. Such clearances prolong belt life.

In the known multi-ribbed belt and grooved pulley power transmission systems, the belt ribs have an angle that is substantially equal to or greater than the groove angle in the grooved pulley. While such clearance arrangements may provide improved performance of multi-rib belts, such clearances are not effective in alleviating manufacturing tolerances associated with belt rib and pulley groove spacing and contour for the purpose of improving belt fit. It is believed that a good fit between a multiple rib belt and its grooved pulley enhances belt life by providing better distribution of frictional loads between the belt ribs and pulley. The problem has been to get the good belt/pulley fit during early, and preferably all, stages of belt operation.

SUMMARY OF THE INVENTION

A ribbed belt is provided which, when viewed in cross section, has ribs with a convex sidewall portion that gives an interference fit with V-shaped walls of a grooved pulley. The convex sidewall portion accommodates small manufacturing tolerances between a belt and a pulley during early stages of belt operation. The convex sidewall portion wears away during belt use to provide a good belt fit in later stages of belt life. The convex sidewall portion has the effect of making the belt rib angle smaller than the pulley groove angle, when viewed in cross section, while simultaneously providing clearances between the belt and pulley for good operation.

An object of the invention is to accommodate small differences between belt rib and pulley groove manufacturing tolerances while still providing a good fit of a ribbed belt with a grooved pulley for proper operation.

A secondary object of the invention is to provide a belt rib profile that minimizes localized stress concentration in a belt rib as the belt is flexed in forward and reverse bends over pulleys.

Other objects or advantages of the invention will be apparent after reviewing the drawings and descriptions thereof wherein.

DESCRIPTION OF ILLUSTRATED EMBODIMENTS

Figure 1:
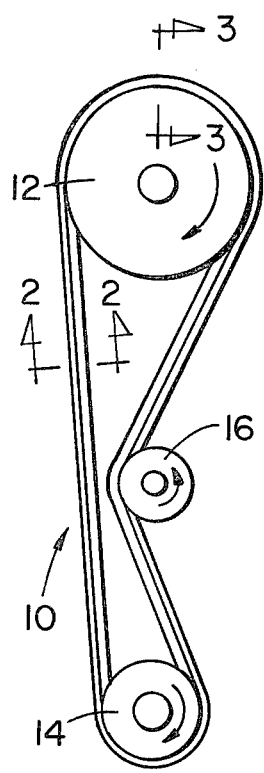
FIG. 1 is a schematic view showing the belt of the invention entrained around grooved pulleys and tensioned with a backside idler.

In the Figures, the power transmission belt 10 of the invention is entrained around multi-grooved pulleys 12, 14 and tensioned by a backside idler 16. The belt is fabricated using known techniques and has a tensile member 18 or load-carrying section that is sandwiched between a first layer 20 forming the top portion of the belt and a second layer 22 in which is formed a plurality of circumferential ribs 24 of substantially U-shape. Any desired material may be used as the tensile member such as cotton, rayon, nylon, polyester, aramid, steel, and even discontinuous fibers oriented for load carrying capability. Any of the suitable elastomeric materials may be used in constructing the first and second layers. For example, elastomerics such as the synthetic rubbers, natural rubbers, blends thereof, and polyurethane may be used. Reinforcements may be used in either or both the first or second layers. For example, one or more layers 26, 28 of textile material may be used at the top surface in the first layer to form a wear-resistant surface 30 to accommodate backside idlers or pulleys in a drive system. The second layer may have fibrous material 32 dispersed therein such as the natural discontinuous cellulose fibers or synthetic fibers such as those suitable for the tensile member.

The ribs may be formed using known techniques such as by molding or grinding. The free span rib profiles of FIGS. 2 and 4 have convex sidewall portions 34, 36 in relation to the profile of a multi-grooved sheave 37 when viewed in cross section as a new belt. It is believed that the convex sidewall portions accommodate certain manufacturing tolerances such as those associated with belt rib spacing B and pulley groove spacing P by providing clearances 38 for wear-in between the belt rib and groove and clearances 41 between adjacent belt ribs and pulley ridges.

Figure 2:
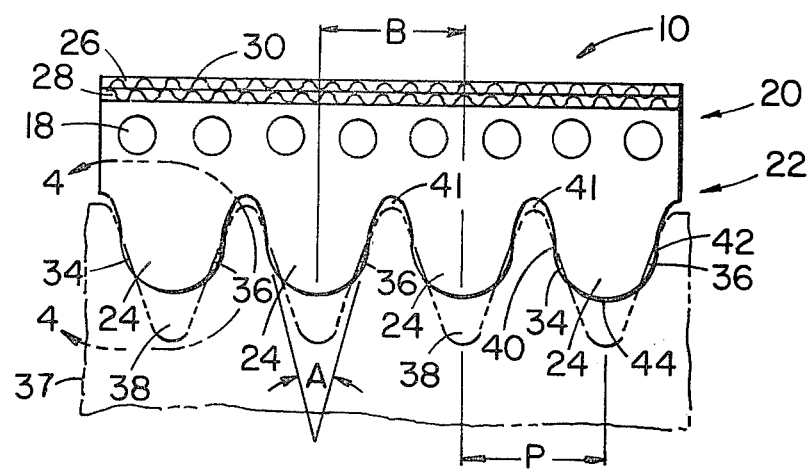
FIG. 2 is an enlarged fragmentary cross sectional view taken along the line 2—2 of FIG. 1 showing the belt in free span superimposed over a grooved pulley that is shown in dotted form. Cross hatching is not used for purpose of clarity.
Figure 4:
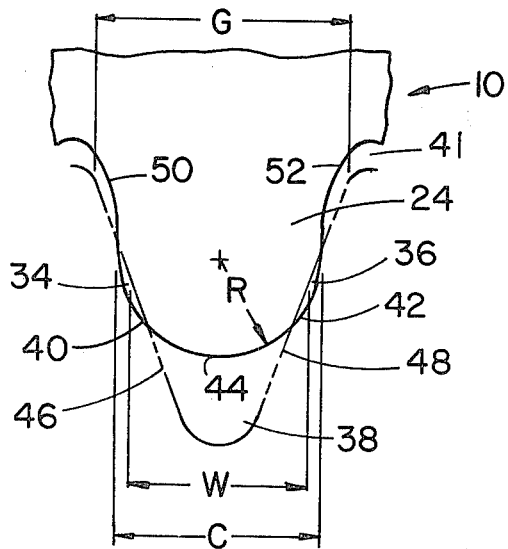
FIG. 4 is an enlarged fragmentary view taken along the line 4—4 of FIG. 2.

As best seen in FIGS. 2 and 4, the belt ribs 24 have oppositely facing sides 40, 42 that convergingly extend to a rib apex 44. The sides define driving surfaces that are characterized by the convex sidewall portions 34, 36 which when viewed in cross section in free span, protrude beyond the confines of the generally V-shaped walls 46, 48 of the grooved pulley. In other words, the rib width C at the convex driving surfaces is greater than a corresponding width W of a pulley groove and more preferably, the rib width is from about 5 to about 15 percent greater than the corresponding pulley groove width. Optionally, the belt ribs have a cross section of substantially U-shape with portions 50, 52 of the legs of the U approaching or being substantially parallel. This provides the preferred clearance 41 between belt rib width and pulley groove width when viewed in cross section. A substantially elliptical rib contour has proven satisfactory in defining a suitable U-shape.

To minimize localized stress in the ribs as the belt is bent forward and backward around entraining pulleys, the interconnecting rib sides and apex are curved throughout a major portion of their cumulative surfaces when viewed in cross section. The apex has a radius R that is preferably greater than about 48 percent of the maximum rib width and more preferably about 73 percent of the rib width so that the ribs have a maximum radius for minimum likelihood of localized stress build up as the belt is flexed. Also, the substantially U-shaped rib with this preferred radius defines a belt rib which has an effective angle A that is smaller than that angle of the pulley groove to ensure a wedge fitting action during the initial stages of belt wear-in. Comparatively, the prior art has belt ribs whose included angle is substantially equal to or greater than that of the pulley groove.

The ribs each optionally may have a maximum width that is less than the corresponding width C of a pulley groove to insure clearance 41 at the pulley groove projections to facilitate wear-in and accommodate differences in manufacturing tolerances of the belt and pulley.

Figure 3:
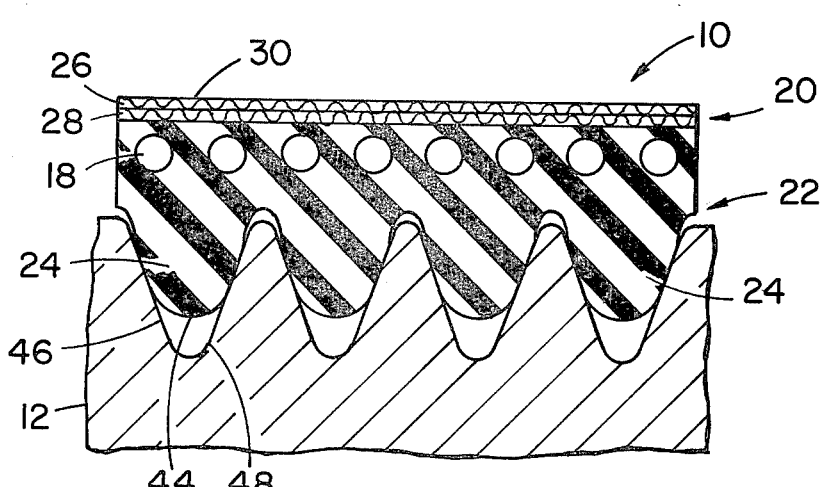
FIG. 3 is a fragmentary cross sectional view taken along the line 3—3 of FIG. 1 showing the belt of the invention entrained in a grooved pulley.

The convex sidewall portions 34, 36 of the ribs are pushed inwardly by the V sidewalls 46, 48 of the pulley groove as the belt goes around the pulley as is illustrated by FIG. 3. Some of the sidewall portions may be pushed inwardly a greater amount than others depending on differences in belt and pulley manufacturing tolerances. Portions of the ribs such as the apex 44 may slightly extend as the convex sidewall portions are pushed inwardly by the sidewalls 46, 48. Initially, the convex sidewall portions 36, 38 create a slight wedging action of the ribs in the pulley groove for good traction. The sidewall portions wear down to a new shape 54, 56 after extended use and in such a manner that the belt ribs closely fit the pulley grooves and maintain good traction. The convex sidewall portions which have slightly higher wall pressure because of differences in belt and pulley tolerances, are believed to wear away at a faster rate than those receiving slightly lesser pressure. This is what is believed to provide a good belt to pulley fit throughout belt life.

Figure 5:
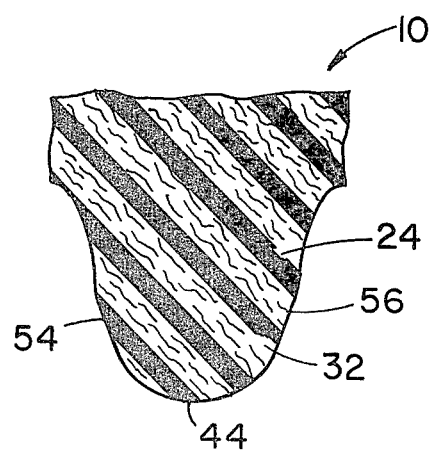
FIG. 5 is a view similar to that of FIG. 4 but showing a worn belt rib after extended use.

The belt ribs of FIGS. 4 and 5 are illustrative of the differences between a new belt having convex sidewall portions, and a belt that has run twenty-five thousand miles in an automobile serpentine drive such as that as illustrated in U.S. Pat. No. 4,028,955.

In a flexure test where a 6 rib, 1 inch wide, 93 inch long belt is entrained around five 2 inch diameter pulleys and five 3 inch diameter backside idlers and operated at 300 pounds constant tension at 3,700 revolutions per minute, belts with the rib contour of the invention had average lives of 185 hours in comparison to average lives of 129 hours for belts of identical construction with the prior art trapezoidal rib contour.

The foregoing detailed description is made for purpose of illustration only and is not intended to limit the scope of the invention which is to be determined from the appended claims.

What is claimed is:

1. In a power transmission belt and pulley system, the belt of the reinforced elastomer and generally flat type having circumferential ribs laterally spaced from each other within manufacturing tolerances and the pulley with grooves laterally spaced from each other within manufacturing tolerances that define generally V-shaped walls that engage the ribs, wherein the improvement comprises:
   belt ribs with each rib having oppositely facing sides that convergently extend and interconnect to a rib apex, the sides defining driving surfaces characterized by convex sidewall portions which when viewed in free span cross section protrude beyond corresponding portions of the V-shaped walls of the grooved pulley and define a belt wear-in means for accommodating manufacturing tolerance differences between the laterally spaced belt ribs and the laterally spaced pulley grooves.

2. The power transmission belt as claimed in claim 1 wherein the interconnecting sides and apex of a rib are curved throughout a major portion of their cumulative surfaces when viewed in cross section.

3. The power transmission belt as claimed in claim 2 wherein the ribs each have a maximum width and an apex radius such that the apex radius is greater than about 48 percent of the maximum rib width.

4. The power transmission belt as claimed in claim 1 wherein the ribs each have a rib width at the convex driving surfaces which is greater than a corresponding width of a groove of the pulley when viewed in cross section.

5. The power transmission belt as claimed in claim 4 wherein the rib width at the convex driving surface is from about 5 to about 15 percent greater than the corresponding groove width.

6. The power transmission belt as claimed in claim 1 wherein the ribs each have a maximum width that is less than a corresponding width of a groove of the pulley when viewed in cross section.

7. The power transmission belt as claimed in claims 1, 2, 4, 5 and 6 wherein the ribs contain an embedded fibrous reinforcement.

8. The power transmission belt as claimed in claims 1, 2, 4, 5 and 6 wherein the ribs have a cross section of substantially U-shape with portions of the legs of the U substantially parallel and outlining portions of the oppositely facing sides.

9. A power transmission belt and pulley system comprising:
   a ribbed-belt pulley having a plurality of circumferential grooves laterally spaced from each other and defining a plurality of V-shaped walls; and
   a power transmission belt of the generally flat type with circumferential ribs that engage the V-shaped walls, the ribs having oppositely facing sides that convergingly extend and interconnect to a rib apex, the sides defining driving surfaces characterized by convex sidewall portions which when viewed in free span across section protrude beyond corresponding portions of the V-shaped walls of the grooved pulley.

* * * * *